Feb. 3, 1959  L. M. PUSTER  2,872,119
THERMOSTATICALLY OPERATED VALVE
Filed Jan. 7, 1957

INVENTOR.
Louis M. Puster.
BY
HIS ATTORNEY.

United States Patent Office 2,872,119
Patented Feb. 3, 1959

2,872,119

THERMOSTATICALLY OPERATED VALVE

Louis M. Puster, Knoxville, Tenn., assignor to Robertshaw-Fulton Controls Company, Greensburg, Pa., a corporation of Delaware Application January 7, 1957, Serial No. 632,919

8 Claims. (Cl. 236—34)

This invention relates to a balanced-type thermostatically operated valve and more particularly to a choker sleeve valve that is used to control the flow of fluid in a conduit in response to temperature variations of the fluid therein.

One object of the present invention is to stabilize the movement of a valve member.

Another object of the invention is to prevent the leakage of fluid past a valve member.

Another object of the invention is to insure a fluid pressure balance across a valve member in all positions thereof.

Another object of the invention is to simplify the construction and arrangement of parts in a sleeve-type valve.

In conformity with these objects, the preferred embodiment of the invention is characterized by a valve member which is slidably mounted on a seal and guide means and which is moved between a plurality of controlling positions relative to a valve seat formed on a support member by a spring-biased, pressure insensitive thermostat. The seal is arranged to prevent the leakage of fluid past the valve member in all of the controlling positions thereof, and the valve member is so constructed and supported as to operate under a balanced fluid pressure condition.

These and other objects of the present invention will become apparent from the following description taken in connection with the accompanying drawing, wherein.

Figure 1:
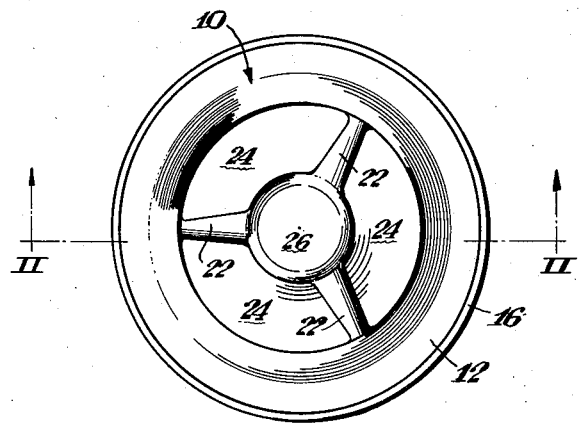
Fig. 1 is a top plan view of the valve.

Referring more particularly to the drawing, the valve includes a support member, generally designated by the reference numeral 10, which is comprised of an annular member or ring 12 having a substantially right angular, radially extending flange 14 thereon. The outer extremities of flange 14 are beveled at 16 and 18, and ring 12 is provided with a flat undersurface 20 thereon which functions as a valve seat, as will be discussed more in detail hereinafter.

A spider member having, in this instance three, spokes 22 is integrally formed with ring 12 and extending radially inward thereof to define three apertures or ports 24 in the support member 10. The spokes 22 have integrally formed therewith a tapered hub or housing portion 26 having a chamber 28 extending from the larger end thereof and provided with an end wall 30 with a centrally located recess 32 therein.

The larger end of the tapered hub portion 26 is provided with a substantially right angular, radially extending guide flange 34 thereon. The peripheral surface 36 of guide flange 34 is provided with an annular recess 38 therein which carries a resilient seal 40 which will be discussed more in detailed hereinafter.

A disc or abutment means 42 extends across the larger end of the hub 26 and is provided with a centrally located aperture 44 therein. The disc 42 is rigidly attached to the hub 26 by any suitable means such as screws 46.

Mounted for slidable movement on the guide flange 34 and seal 40 is a balanced, cylindrical-shaped sleeve valve member 48. Valve member 48 is provided with a flat, annular end wall 50 which is adapted to seat on valve seat 20. The opposite end of valve member 48 is provided with an end wall 52 which is angularly deformed at 54 to define an annular wall 56 thereon which terminates in an inturned flange 58, flange 58 defining a centrally located port 59 in the valve member 48. End wall 52 is also provided with a plurality of ports 60 therein (only two shown) with at least one of the ports 60 being formed by striking a tab 61 from the end wall 52.

A pressure insensitive, wax-fusion type thermostat or thermally responsive means, generally designated by the reference numeral 62, is positioned between the valve member 48 and the end wall 30 of hub 26. The thermostat 62 includes a casing or housing 64, a clamping and sealing band 66, a hollow cylindrical member 68, and an extensible and retractible piston 70 which is slidably received in the inner bore (not shown) of member 68. The outer periphery of member 68 is provided with a tapered portion 72 thereon, and the free end of member 68 terminates in an enlarged head 74. The casing 64 is filled with a wax-like substance (not shown) which changes from a solid to a liquid at a predetermined temperature and the change in volume thereof produces movement of a diaphragm (not shown) located in the band 66 which in turn imparts movement to the extensible and retractible piston 70.

Thermostat 62 is a pressure insensitive-type thermostat since it is insensitive to the static or system pressures in a fluid in which it may operate or may be submerged, such as the static or system pressures in the cooling system of an internal combustion engine. These static or system pressures when applied to the thermostat extensible and retractible piston 70 will be transmitted to the diaphragm and wax-like substance within the thermostat 62, but the wax-like substance is for all practical purposes incompressible. In view of this incompressibility, the movement of the thermostat piston 70, therefore, is not affected by static or system pressures or by any change in external loading. Inasmuch as thermostats of this type are well known in the art, further discussion of the structure and function of the thermostat per se is deemed unnecessary.

In assembly, the band 66 of the thermostat 62 is seated on the inturned flange 58 and is retained in assembled engagement with the valve member 48 by tab 61. Casing 64 of the thermostat 62 extends through valve member port 59 and the extensible and retractible piston 70 thereof is seated within the recess 32 in wall 30 of hub 26. When piston 70 extends in response to an increase in fluid temperature, the other components of the thermostat 62 are axially displaced relative thereto and the valve member 48 is thereby moved downwardly relative to valve seat 20, the valve member 48 thus becoming unseated.

The movement of the valve member 48 by the thermostat 62 is opposed by the thrust of a compression spring 76. The compression spring 76 has one end thereof seated on the apertured disc 42 and the opposite end thereof seated on the undersurface 78 of the head 74 on the free end of thermostat member 68. It will be noted that the compression spring 76 constantly urges the valve member 48 toward engagement with valve seat 20.

Operation

Figure 2:
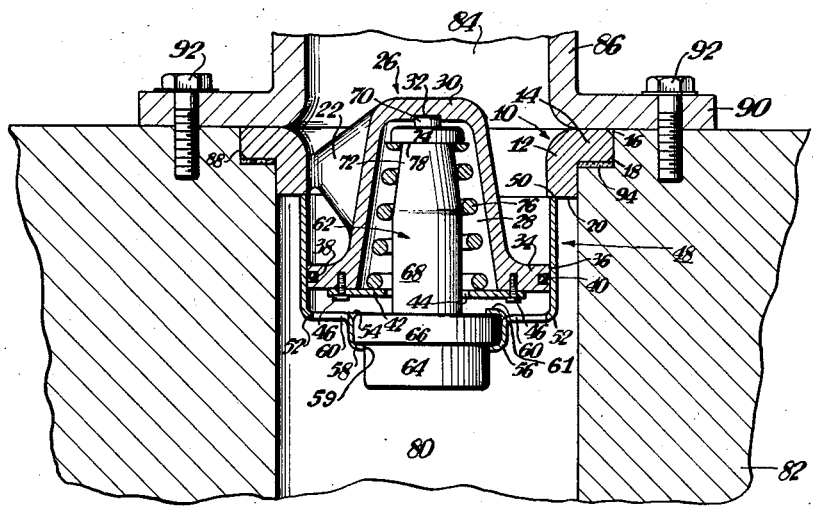
Fig. 2 is a section taken along the line II—II of Fig. 1 with some of the components of the valve shown in elevation and with the valve installed in the position of intended use.

Referring to Fig. 2, the subject valve is shown installed between the mating ends of a pair of conduits, such as a fluid coolant conduit 80 in the head 82 (shown cutaway) of an internal combustion engine and a conduit 84 in a fluid manifold 86 (shown cutaway). The flange 14 on support member 10 is seated within an annular recess 88 in engine head 82 and is retained therein by an annular flange 90 on the manifold 86, the manifold 86 being rigidly anchored to the engine head 82 by any suitable means such as a pair of bolts 92. A gasket 94 is positioned in recess 88 to prevent leakage around flange 14.

With the valve so positioned, it will be noted that the casing 64 of the thermostat 62 projects downwardly into the coolant conduit 80 where it is always exposed to the maximum velocity of fluid flow therein. This structural arrangement enables the wax-like substance in casing 64 to instantaneously and accurately reflect the variations in temperature of the fluid passing through conduit 80.

It will also be noted that the compression spring 76 has moved the valve member 48 to the "closed" position. In this position of the valve member 48, the passage of fluid between the conduits 80 and 84 will be prevented by the engagement of valve member end wall 50 with valve seat 20 and also by the engagement of the seal 40 with the inner periphery of the valve member.

If the temperature of the fluid in conduit 80 should increase sufficiently to produce an extension of thermostat piston 70, the other components of the thermostat 62 will be moved downwardly to thereby unseat the valve member 48. The fluid in conduit 80 will then flow over the valve member end wall 50 and pass through the plurality of ports 24 in support member 10 into manifold conduit 84.

If the temperature of the fluid in conduit 80 should decrease after the valve member 48 has been moved to the "open" position, piston 70 of thermostat 62 will be retracted by the thrust of compression spring 76 and the valve member will be moved back into engagement with the valve seat 20.

In moving between the "open" and "closed" positions, it will be noted that the valve member 48 is guided and stabilized by the guide flange peripheral surface 36 in combination with the seal 40. In addition to stabilizing the movement of the valve member 48, seal 40 also snugly engages the inner periphery of the valve member 48 and thereby prevents the leakage of fluid past the valve in all of the controlling positions of the valve member.

It will also be noted that the sleeve valve member 48, in all of the controlling positions thereof, is pressure balanced or insensitive to variations in fluid pressure, i. e., variations in fluid pressure in conduit 80 will not produce any axial movement of the valve member 48. Ports 60 eliminate any unbalanced fluid pressure areas on the valve member 48 below the guide flange 34 and seal 40, and the fluid pressure forces which would otherwise tend to produce axial movement of the valve member are absorbed by the guide flange 34, a portion of the disc 42, and the tapered hub 26. Similarly, the fluid pressure forces in conduit 80 which act on the valve member 48 above the guide flange 34 and seal 40 will be applied radially to the valve member and will obviously produce no axial movement thereof. This pressure balance or pressure insensitivity of the valve member 48 is especially important since it prevents the transmittal of axial forces to the thermostat 62 in the event of pressure drops across the valve member 48 whereby thermostat 62 will control the movement of the valve member 48 only in response to variations in fluid temperature.

While the present invention has been herein shown and described in connection with the cooling system of an internal combustion engine, it will be understood that the invention is not to be limited to this particular environmental application. Quite obviously, a thermostatically operated valve constructed in accordance with the present invention can be advantageously utilized in any environmental application wherein it is desirable to use a balanced choker-type sleeve valve which is provided with a valve member controlled by a thermostat and resilient means and guided by a flange and a seal to move between a plurality of controlling positions relative to a valve seat on a support member.

Furthermore, while only one embodiment of the present invention has been herein shown and described, it will be apparent to those skilled in the art that the construction and arrangement of parts may be variously embodied or changed without departing from the scope of the invention as defined in the appended claims.

It is claimed and desired to secure by Letters Patent:

1. A valve for controlling the flow of fluid comprising an apertured support member, a valve seat on said support member, a housing integrally formed on said support member and provided with guide means thereon, sealing means carried by said guide means, a valve member operatively engageable with said guide means and said sealing means and being movable between a plurality of controlling positions relative to said valve seat, said valve member having an apertured wall portion disposed below said housing to facilitate the flow of fluid relative to said valve member, thermally responsive means operatively engageable with said valve member and said housing for producing movement of said valve member in response to changes in a temperature condition, and resilient means operatively associated with said thermally responsive means for opposing the movement of said valve member by said thermally responsive means, said sealing means and said guide means being operable to insure a fluid pressure balance across said valve member in all of said controlling positions thereof.

2. In a flow control valve, the combination comprising a flanged support member having a plurality of spokes thereon defining a plurality of fluid ports in said support member, a valve seat on said support member, a hub integrally formed with said spokes and provided with guide means thereon, a valve member cooperable with said guide means and being movable between a plurality of controlling positions relative to said valve seat, thermally responsive means operatively connected to said valve member and said hub for producing movement of said valve member, and resilient means operatively associated with said thermally responsive means for opposing the movement of said valve member by said thermally responsive means.

3. In a temperature responsive valve for controlling the flow of fluid in a conduit or the like, the combination comprising a flanged support member having a plurality of integral spokes thereon defining a plurality of fluid ports in said support member, a valve seat on said support member, a housing integrally formed with said spokes and terminating at one end thereof in a guide flange, a valve member cooperable with said guide flange and movable between a plurality of flow controlling positions relative to said valve seat, thermally responsive means operatively engageable with said valve member and said housing for producing movement of said valve member in response to changes in the temperature of said fluid in said conduit, abutment means carried by said housing, and resilient means operatively associated with said abutment means and said thermally responsive means for opposing the movement of said valve member by said thermally responsive means.

4. A temperature sensitive valve for controlling the flow of fluid in a conduit or the like comprising a flanged support member having a plurality of spokes thereon defining a plurality of fluid ports in said support member, a valve seat on said support member, a hub carried by said spokes and provided with a guide flange thereon, a seal carried by said guide flange, a valve member movable between a plurality of flow controlling positions relative to said valve seat, said valve member having an end wall provided with fluid port means and a cylindrical wall engageable with said guide flange and said seal, thermally responsive means operatively engageable with said valve member and said hub for producing movement of said valve member in response to changes in the temperature of said fluid, abutment means carried by said hub, and resilient means cooperable with said abutment means and said thermally responsive means for opposing the movement of said valve member by said thermally responsive means, said seal and said guide flange being operable to insure a fluid pressure balance across said valve member in all positions of said valve member.

5. A temperature sensitive valve as claimed in claim 4 wherein said hub is integrally formed with said spokes.

6. A temperature sensitive valve as claimed in claim 4 wherein said resilient means is comprised of a compression spring having one end seated on said thermally responsive means and the other end seated on said abutment means.

7. A temperature sensitive valve as claimed in claim 4 wherein said guide flange is provided with a peripheral recess therein and wherein said seal is carried in said peripheral recess.

8. A temperature sensitive valve as claimed in claim 4 wherein said hub is closed at one end and open at the other end thereof, and wherein said abutment means is comprised of an apertured disc extending across the open end of said hub.

References Cited in the file of this patent

UNITED STATES PATENTS

| | | |
|---|---|---|
| 1,639,286 | Carson | Aug. 16, 1927 |
| 2,469,930 | Payne | May 10, 1949 |